US010867299B2

(12) United States Patent
Cheng et al.

(10) Patent No.: US 10,867,299 B2
(45) Date of Patent: Dec. 15, 2020

(54) METHODS AND DEVICES FOR PROVIDING TRANSACTION DATA TO BLOCKCHAIN SYSTEM FOR PROCESSING

(71) Applicant: Advanced New Technologies Co., Ltd., Grand Cayman (KY)

(72) Inventors: Long Cheng, Zhejiang (CN); Yanpeng Li, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/717,501

(22) Filed: Dec. 17, 2019

(65) Prior Publication Data

US 2020/0286082 A1 Sep. 10, 2020

Related U.S. Application Data

(63) Continuation of application No. PCT/CN2019/076873, filed on Mar. 4, 2019.

(51) Int. Cl.
*G06Q 20/30* (2012.01)
*G06Q 20/38* (2012.01)
*G06Q 30/04* (2012.01)
*G06F 16/23* (2019.01)

(52) U.S. Cl.
CPC ....... *G06Q 20/389* (2013.01); *G06F 16/2365* (2019.01); *G06F 16/2379* (2019.01); *G06Q 30/04* (2013.01)

(58) Field of Classification Search
CPC ...... G06Q 20/389; G06Q 30/04; G06F 16/00; G06F 21/64; H04L 9/32

USPC .............................................. 726/26; 705/34
See application file for complete search history.

(56) References Cited

U.S. PATENT DOCUMENTS

| 9,351,124 | B1 * | 5/2016 | Shelton | H04W 4/029 |
| 10,261,711 | B1 * | 4/2019 | Pasirstein | G06F 16/907 |
| 10,320,569 | B1 * | 6/2019 | Wentz | H04L 9/0866 |
| 10,459,990 | B1 * | 10/2019 | Li | G06F 16/9035 |
| 10,536,445 | B1 * | 1/2020 | Lerner | H04L 9/3239 |

(Continued)

FOREIGN PATENT DOCUMENTS

| CN | 106503994 A | 3/2017 |
| CN | 107423124 A | 12/2017 |

(Continued)

OTHER PUBLICATIONS

Songpu Ai, Diankai Hu, Tong Zhang, Yunpeng Jiang, Chunming Rong, Blockchain based Power Transaction Asynchronous Settlement System May 1, 2020. IEEE Xplore, VTC2020-Spring (Year: 2020).*

(Continued)

*Primary Examiner* — Oluseye Iwarere
(74) *Attorney, Agent, or Firm* — Finnegan, Henderson, Farabow, Garrett & Dunner, L.L.P.

(57) ABSTRACT

Disclosed herein are methods, devices, and apparatuses, including computer programs stored on computer-readable media, for providing transaction data to a blockchain system for processing. One of the methods includes: monitoring the transaction data in a computer system, wherein the transaction data include at least one of single-transaction data or multiple-transaction data; and based on the monitoring, asynchronously uploading the transaction data to the blockchain system.

17 Claims, 8 Drawing Sheets

(56) References Cited

U.S. PATENT DOCUMENTS

| | | | | |
|---|---|---|---|---|
| 2016/0012465 | A1* | 1/2016 | Sharp | G06Q 20/384 |
| | | | | 705/14.17 |
| 2017/0041296 | A1* | 2/2017 | Ford | H04W 12/06 |
| 2017/0046664 | A1* | 2/2017 | Haldenby | G06Q 20/0655 |
| 2017/0046799 | A1* | 2/2017 | Chan | H04N 5/913 |
| 2017/0118301 | A1* | 4/2017 | Kouru | H04L 67/06 |
| 2017/0295232 | A1* | 10/2017 | Curtis | H04L 67/06 |
| 2018/0025181 | A1* | 1/2018 | Barinov | G06F 21/645 |
| | | | | 726/26 |
| 2018/0082024 | A1* | 3/2018 | Curbera | G06F 21/00 |
| 2018/0131716 | A1* | 5/2018 | Chantz | H04L 63/1441 |
| 2018/0196694 | A1* | 7/2018 | Banerjee | G06F 9/466 |
| 2018/0198624 | A1* | 7/2018 | Bisti | H04L 9/0891 |
| 2018/0204213 | A1* | 7/2018 | Zappier | H04L 63/08 |
| 2018/0218022 | A1* | 8/2018 | Mace | G06F 16/2343 |
| 2018/0225660 | A1* | 8/2018 | Chapman | G06Q 20/401 |
| 2018/0232828 | A1* | 8/2018 | Joao | G06Q 20/227 |
| 2018/0239959 | A1* | 8/2018 | Bui | G06Q 10/10 |
| 2018/0276597 | A1* | 9/2018 | Fuller | G06Q 10/087 |
| 2018/0322597 | A1* | 11/2018 | Sher | H04L 67/22 |
| 2018/0365201 | A1* | 12/2018 | Hunn | G06F 40/186 |
| 2018/0374283 | A1* | 12/2018 | Pickover | G07C 5/085 |
| 2019/0050831 | A1* | 2/2019 | Kikinis | G06Q 20/389 |
| 2019/0066063 | A1* | 2/2019 | Jessamine | G06Q 20/4014 |
| 2019/0074968 | A1* | 3/2019 | Liu | H04L 9/14 |
| 2019/0095879 | A1* | 3/2019 | Eyal | G06Q 20/06 |
| 2019/0116142 | A1* | 4/2019 | Chalakudi | H04L 67/1097 |
| 2019/0251279 | A1* | 8/2019 | Emberson | H04L 63/0227 |
| 2019/0286805 | A1* | 9/2019 | Law | G06F 21/34 |
| 2019/0340136 | A1* | 11/2019 | Irwin | G06F 3/0683 |
| 2019/0361697 | A1* | 11/2019 | Hu | G06F 8/433 |
| 2019/0361731 | A1* | 11/2019 | Qiu | G06F 9/28 |
| 2019/0370760 | A1* | 12/2019 | Kundu | G06Q 40/08 |
| 2019/0379531 | A1* | 12/2019 | Aleksander | G06F 16/152 |
| 2019/0386817 | A1* | 12/2019 | Carson | H04L 9/0637 |
| 2020/0014527 | A1* | 1/2020 | Subramaniam | H04L 9/0825 |
| 2020/0044863 | A1* | 2/2020 | Yadlin | H04L 9/3247 |
| 2020/0051092 | A1* | 2/2020 | D'Souza | G06Q 30/014 |
| 2020/0053128 | A1* | 2/2020 | Bhosale | G06F 21/64 |
| 2020/0059363 | A1* | 2/2020 | Lobo | G06F 16/2365 |
| 2020/0073698 | A1* | 3/2020 | Wu | H04L 9/3239 |
| 2020/0074113 | A1* | 3/2020 | DeRosa-Grund | H04L 9/0637 |
| 2020/0074429 | A1* | 3/2020 | DeRosa-Grund | G06Q 20/389 |
| 2020/0174990 | A1* | 6/2020 | Pratkanis | H04L 9/3218 |
| 2020/0186355 | A1* | 6/2020 | Davies | H04L 9/0643 |
| 2020/0204350 | A1* | 6/2020 | Kramer | G06Q 20/401 |
| 2020/0226678 | A1* | 7/2020 | Magnabosco | H04L 9/0643 |

FOREIGN PATENT DOCUMENTS

| | | |
|---|---|---|
| CN | 107688945 A | 2/2018 |
| CN | 108805702 A | 11/2018 |
| CN | 109118364 A | 1/2019 |
| WO | WO 2018/154082 A1 | 8/2018 |

OTHER PUBLICATIONS

Written Opinion of the International Searching Authority of PCT Application No. PCT/CN2019/076873, dated Dec. 11, 2019, issued by the ISA/CN—National Intellectual Property Administration, PRC, China.

International Search Report of PCT Application No. PCT/CN2019/076873, dated Dec. 11, 2019, issued by the ISA/CN—National Intellectual Property Administration, PRC, China.

Extended European Search Report for Application No. 19725906.2, dated May 25, 2020.

Antonopoulos, Andreas M., *Mastering Bitcom,—Programming the Open Blockchain*, Jun. 2017, Second Edition, 405 pgs.

* cited by examiner

METHODS AND DEVICES FOR PROVIDING TRANSACTION DATA TO BLOCKCHAIN SYSTEM FOR PROCESSING

CROSS REFERENCE TO RELATED APPLICATIONS

This application is a continuation of International Application No. PCT/CN2019/076873, filed Mar. 4, 2019, the entire content of which is incorporated herein by reference.

TECHNICAL FIELD

The specification relates generally to computer technologies, and more particularly, to methods and devices for providing transaction data to a blockchain system for processing.

BACKGROUND

Blockchain systems, also known as distributed ledger systems (DLSs) or consensus systems, may enable participating entities to store data securely and immutably. Blockchain systems may include any DLSs, without referencing any particular use case, and may be used for public, private, and consortium blockchain networks. A public blockchain network is open for all entities to use the system and participate in the consensus process. A private blockchain network is provided for a particular entity, which centrally controls read and write permissions. A consortium blockchain network is provided for a select group of entities, which control the consensus process, and includes an access control layer.

A blockchain system maintains one or more blockchains. A blockchain is a data structure for storing data, such as transactions, that may prevent tampering and manipulation of the data by malicious parties.

In conventional recording of transaction data based on a blockchain system, the transaction data are synchronously provided to a blockchain system in real time for recordation. For example, a transaction data system uploads transaction data to the blockchain system as soon as it obtains the data, without checking a status of the blockchain system. As such, sometimes the blockchain system may be overloaded or even stalled.

SUMMARY

In one embodiment, a computer-implemented method for providing transaction data to a blockchain system for processing, the method comprising: monitoring the transaction data in a computer system, wherein the transaction data include at least one of single-transaction data or multiple-transaction data; and based on the monitoring, asynchronously uploading the transaction data to the blockchain system.

In another embodiment, there is provided a device for providing transaction data to a blockchain system for processing, comprising: one or more processors; and one or more computer-readable memories coupled to the one or more processors and having instructions stored thereon that are executable by the one or more processors to: monitor the transaction data in a computer system, wherein the transaction data include at least one of single-transaction data or multiple-transaction data; and based on the monitoring, asynchronously upload the transaction data to the blockchain system.

In another embodiment, there is provided a non-transitory computer-readable medium having stored therein instructions that, when executed by a processor of a device, cause the device to perform a method for providing transaction data to a blockchain system for processing, the method comprising: monitoring the transaction data in a computer system, wherein the transaction data include at least one of single-transaction data or multiple-transaction data; and based on the monitoring, asynchronously uploading the transaction data to the blockchain system.

BRIEF DESCRIPTION OF THE DRAWINGS

The accompanying drawings, which are incorporated in and constitute a part of this specification, illustrate embodiments. In the following description, which refers to the drawings, the same numbers in different drawings represent the same or similar elements unless otherwise represented.

DETAILED DESCRIPTION

Embodiments of the specification provide methods and devices for providing transaction data to a blockchain system for processing, verifying accuracy of the transaction data, and recording bill and payment information in the blockchain system. In the methods, a computer system may monitor a status of the blockchain system and transaction data in the computer system, and based on the monitoring, may asynchronously upload transaction data to the blockchain system. Another computer system may verify accuracy of the uploaded transaction data by comparing the uploaded transaction data with its own transaction data. After the verification, a settlement system may settle a bill and inform a payment system. The payment system may upload a payment statement to the blockchain system and proceed with processing the payment.

Embodiments disclosed in the specification have one or more technical effects. In some embodiments, the methods and devices monitor transaction data in a computer system and a status of a blockchain system. This allows determining a time to submit the transaction data to the blockchain system when the blockchain system is in a good status to receive and process the transaction data. In some embodiments, the methods and devices upload single-transaction data or an aggregation of multiple-transaction data to the blockchain system at a specified time, based on characteristics of the transaction data and the status of the blockchain system. This prevents the blockchain system from overloading and thereby enhances capability of the blockchain system. In some embodiments, the methods and devices automatically authenticate transaction data, verify accuracy of the transaction data, settle a bill and process a payment utilizing the blockchain system, thereby eliminating the need for a central intermediary, enhancing security and efficiency of the entire transaction processing, and reducing a transaction cost.

The following description provides details of embodiments. In the embodiments, a blockchain is a data structure that stores data, e.g., transactions, in a way that the transactions may be immutable and subsequently verified. A blockchain includes one or more blocks. Each block is linked to a previous block immediately before it in the blockchain by including a cryptographic hash of the previous block. Each block also may include a timestamp, its own cryptographic hash, and one or more transactions. The transactions, which generally have already been verified by the nodes of the blockchain system, may be hashed and encoded into a data structure, such as a Merkle tree. In a Merkle tree, data at leaf nodes of the tree is hashed, and all hashes in each branch of the tree may be concatenated at a root of the branch. This process continues up the tree to the root of the entire tree, which stores a hash that is representative of all data in the tree. A hash purporting to be of a transaction stored in the tree can be quickly verified by determining whether it is consistent with the structure of the tree.

A blockchain system includes a network of computing nodes that manage, update, and maintain one or more blockchains. The network may be a public blockchain network, a private blockchain network, or a consortium blockchain network. In a public blockchain network, the consensus process is controlled by nodes of the consensus network. For example, numerous entities, such as hundreds, thousands, or even millions of entities, can operate in a public blockchain network, and each of the entities operates at least one node in the public blockchain network. Accordingly, the public blockchain network can be considered a public network with respect to the participating entities. Sometimes, a majority of entities (nodes) must sign every block in order for the block to be validated and added to the blockchain of the blockchain network. Examples of public blockchain networks include particular peer-to-peer payment networks that leverage a distributed ledger, referred to as blockchain.

In general, a public blockchain network may support public transactions. A public transaction is shared with all of the nodes in the public blockchain network, and is stored in a global blockchain. A global blockchain is a blockchain replicated across all nodes, and all nodes are in consensus with respect to the global blockchain. To achieve consensus (e.g., agreement to the addition of a block to a blockchain), a consensus protocol is implemented in the public blockchain network. Examples of consensus protocols include proof-of-work (POW) (e.g., implemented in the some crypto-currency networks), proof-of-stake (POS), and proof-of-authority (POA).

In general, a private blockchain network may be provided for a particular entity, which centrally controls read and write permissions. The entity controls which nodes are able to participate in the blockchain network. Consequently, private blockchain networks are generally referred to as permissioned networks that place restrictions on who is allowed to participate in the network, and on their level of participation (e.g., only in certain transactions). Various types of access control mechanisms can be used (e.g., existing participants vote on adding new entities, a regulatory authority can control admission).

In general, a consortium blockchain network may be private among the participating entities. In a consortium blockchain network, the consensus process is controlled by an authorized set of nodes, one or more nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. Accordingly, the consortium blockchain network can be considered a private network with respect to the participating entities. In some examples, each entity (node) must sign every block in order for the block to be validated and added to the blockchain. In some examples, at least a sub-set of entities (nodes) (e.g., at least 7 entities) must sign every block in order for the block to be validated and added to the blockchain.

Figure 1:
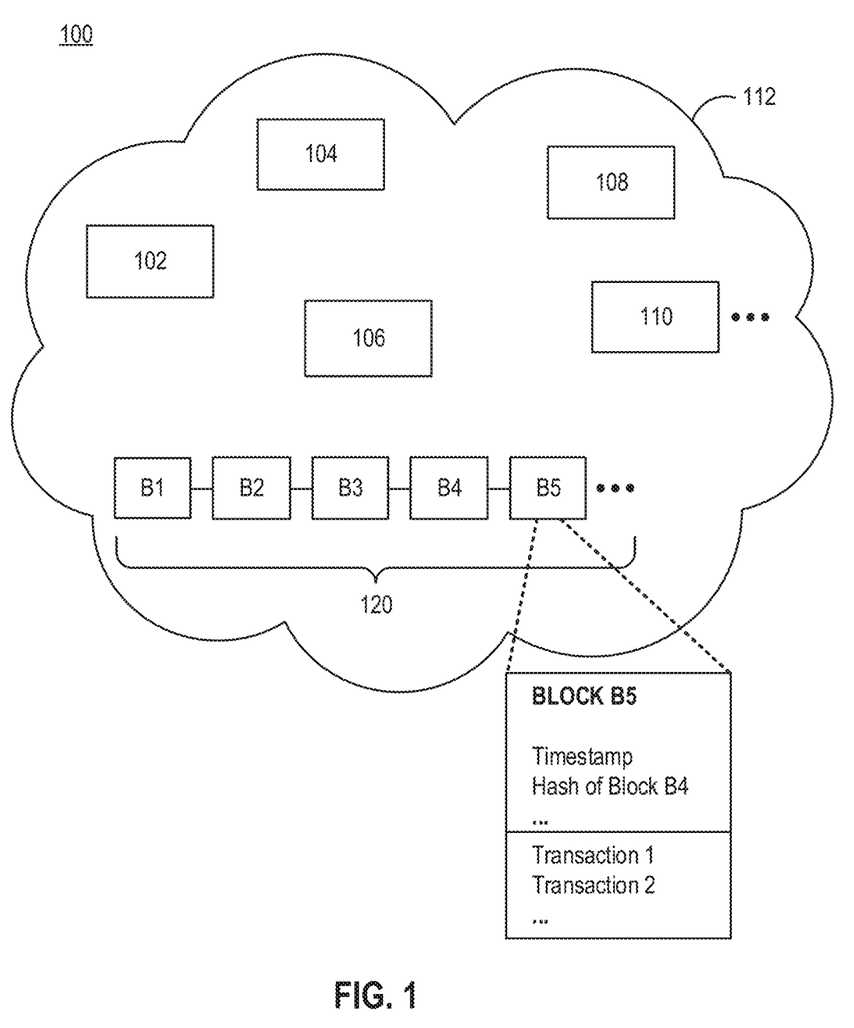
FIG. 1 is a schematic diagram of a blockchain system, according to an embodiment.

FIG. 1 illustrates a schematic diagram of a blockchain system 100, according to an embodiment. Referring to FIG. 1, the blockchain system 100 may include a plurality of nodes, e.g., nodes 102-110, configured to operate on a blockchain 120. The nodes 102-110 may form a network 112, such as a peer-to-peer (P2P) network. Each of the nodes 102-110 may be a computing device, such as a computer or a computer system, configured to store a copy of the blockchain 120, or may be software running on the computing device, such as a process or an application. Each of the nodes 102-110 may have a unique identifier. The nodes 102-110 may communicate with one another by a wired or wireless communication. Such communication may adopt a reliable protocol such as a Transmission Control Protocol/Internet Protocol (TCP/IP).

The blockchain 120 may include a growing list of records in the form of data blocks, such as blocks B1-B5 in FIG. 1. Each of the blocks B1-B5 may include a timestamp, a cryptographic hash of a previous block, and data of the present block, which may be transactions such as monetary transactions. For example, as illustrated in FIG. 1, block B5 may include a timestamp, a cryptographic hash of block B4, and transaction data of block B5. Also, for example, a hashing operation may be performed on the previous block to generate the cryptographic hash of the previous block. The hashing operation may convert inputs of various lengths into cryptographic outputs of a fixed length through a hash algorithm, such as SHA-256.

The nodes 102-110 may be configured to perform an operation on the blockchain 120. For example, when a node, e.g., the node 102, wants to store new data onto the blockchain 120, that node may generate a new block to be added to the blockchain 120 and broadcast the new block to other nodes, e.g., the nodes 104-110, in the network 112. Based on legitimacy of the new block, e.g., validity of its signature and transactions, the other nodes may determine to accept the new block, such that the node 102 and the other nodes may add the new block to their respective copies of the blockchain 120. As this process repeats, more and more blocks of data may be added to the blockchain 120.

In an embodiment, the blockchain system 100 may operate according to one or more smart contracts. Each smart contract may be a computer protocol in the form of computer code that is incorporated into the blockchain 120, to facilitate, verify, or enforce the negotiation or performance of a contract. For example, a user of the blockchain system 100 may program agreed terms into a smart contract using a programming language, such as C++, Java, Solidity, Python, etc., and when the terms are met, the smart contract may be automatically executed by the blockchain system 100, e.g., to perform a transaction. Also, for example, the smart contract may include a plurality of subroutines or functions, each of which may be a sequence of program instructions that performs a specific task. The smart contract may be operational code that is fully or partially executed without human interaction.

Figure 2:
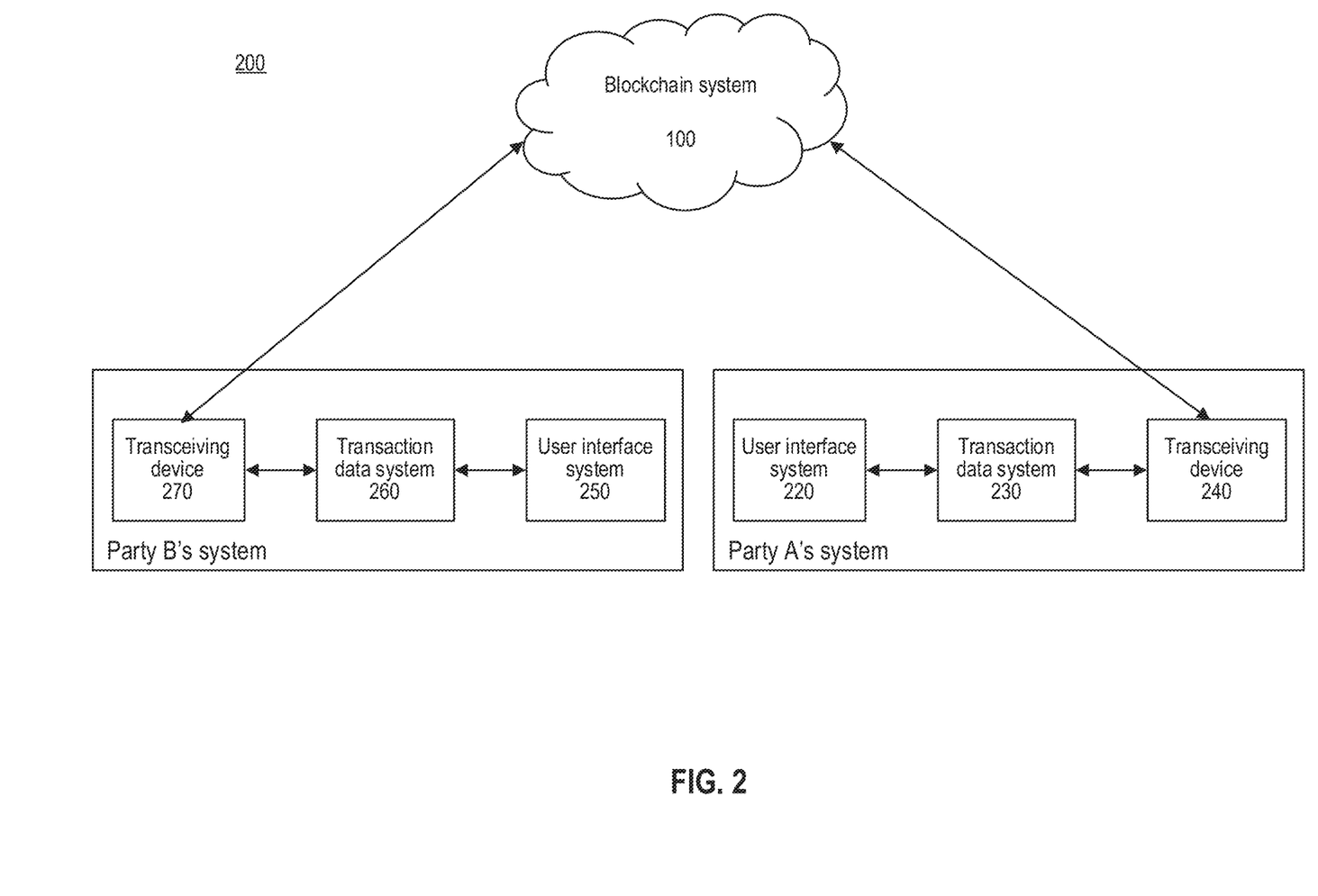
FIG. 2 is a schematic diagram illustrating systems for providing transaction data to a blockchain system for processing, according to an embodiment.

FIG. 2 is a schematic diagram illustrating systems for providing transaction data to a blockchain system, such as the blockchain system 100 (FIG. 1), for processing, according to an embodiment. For illustrative purpose only, first and second systems of a party A and a party B, respectively, are shown in FIG. 2. In an embodiment, each party's system may be a computer system that includes a user interface system and a transaction data system. In some embodiments, each party's system may operate as a node of the blockchain system 100. In other embodiments, each party's system may not operate as a node of the blockchain system 100.

In some embodiments, the user interface system is implemented as a party's business system, and the transaction data system is implemented as a party's accounting system. For example, the party A's system may include a user interface system 220 that reports transaction data to a transaction data system 230. The transaction data system 230 may record the transaction data. Similarly, the party B's system may include a user interface system 250 and a transaction data system 260. Further, each party's system may include a transceiving device that uploads its own transaction data to the blockchain system 100 for verification and further processing. For example, the party A's system may include a transceiving device 240 that obtains transaction data from the transaction data system 230 and uploads the data to the blockchain system 100. Similarly, the party B's system may include a transceiving device 270 that obtains transaction data from the transaction data system 260 and uploads the data to the blockchain system 100.

In an embodiment, the transceiving device 240 may operate as a buffer for temporary storage of the transaction data so that the transaction data may not be immediately processed by the blockchain system 100 after being generated, but may be asynchronously uploaded to the blockchain system 100. In an embodiment, the transceiving device 240 may further operate as a controller for the uploading, to determine whether to upload single-transaction data or an aggregation of multiple-transaction data. For example, the single-transaction data may be data generated during a single transaction, and the multiple-transaction data may be data generated during multiple transactions. Also for example, the aggregation of multiple-transaction data may be generated by performing an aggregation on data generated during multiple transactions. In an embodiment, there are a plurality of transactions between the party A and the party B. Instead of individually recording each of the transactions on a blockchain of the blockchain system 100, the transaction data system 230 or the transceiving device 240, for example, may perform an aggregation on data generated during the transactions to generate an aggregation of multiple-transaction data, which may then be temporarily stored in the transceiving system 240 when the blockchain system 100 is in a busy status. The transceiving device 240 may further control a timing of the uploading of transaction data to the blockchain system 100. In an embodiment, if the transceiving device 240 determines to upload the aggregation of multiple-transaction data, the transceiving device 240 may request the multiple-transaction data from the transaction data system 230 and generate the aggregation. The transceiving device 240 may control the uploading based on monitoring of the transaction data system 230 and the blockchain system 100.

In an embodiment, the transceiving device 240 may monitor accounts in the transaction data system 230. For example, the transceiving device 240 may monitor multiple transactions to determine whether they have repeated features. The transceiving device 240 may also monitor a size of transaction data and estimate a processing time.

In an embodiment, the transceiving device 240 may also monitor a status of the blockchain system 100. For example, the transceiving device 240 may monitor a size of a data block of the blockchain system 100, a frequency of uploading of data to the blockchain system 100, and a number of transactions processed by the blockchain system 100 during a predetermined time period. Based on the monitoring, the transceiving device 240 may determine an optimal number (single transaction or aggregation of multiple transactions) and a size of transaction data to be uploaded. This may prevent the blockchain system 100 from decreased processing efficiency due to overloading. Also, based on the monitoring, the transceiving device 240 may determine an optimal timing for uploading. This may avoid uploading data during a peak frequency of uploading to the blockchain system 100, further preventing decreased efficiency or even stall of the blockchain system due to high-frequency uploading.

The transceiving device 270 in the party B's system may also control uploading of transaction data obtained from the transaction data system 260 in a manner similar to that of the transceiving device 240. For the sake of brevity, the descriptions of the operations of the transceiving device 270 are omitted here. In an embodiment, the transaction data uploading and recording are performed based on a smart contract.

In an embodiment, the transceiving device 240 may be functional blocks of the instructions stored in the transaction data system 230, and a processor of the transaction data system 230 may execute the instructions to perform the functions of the transceiving device 240. Similarly, the transceiving device 270 may be functional blocks of the instructions stored in the transaction data system 260, and a processor of the transaction data system 260 may execute the instructions to perform the functions of the transceiving device 270.

In an embodiment, each of the transceiving device 240 and the transceiving device 270 may be an independent hardware that includes integrated circuits that may be compatible with any transaction data system and blockchain system. For example, the transceiving device 240 may also be implemented in the party B's system so the transceiving device 240 can interface with the transaction data system 260 and the blockchain system 100 without modification.

Figure 3:
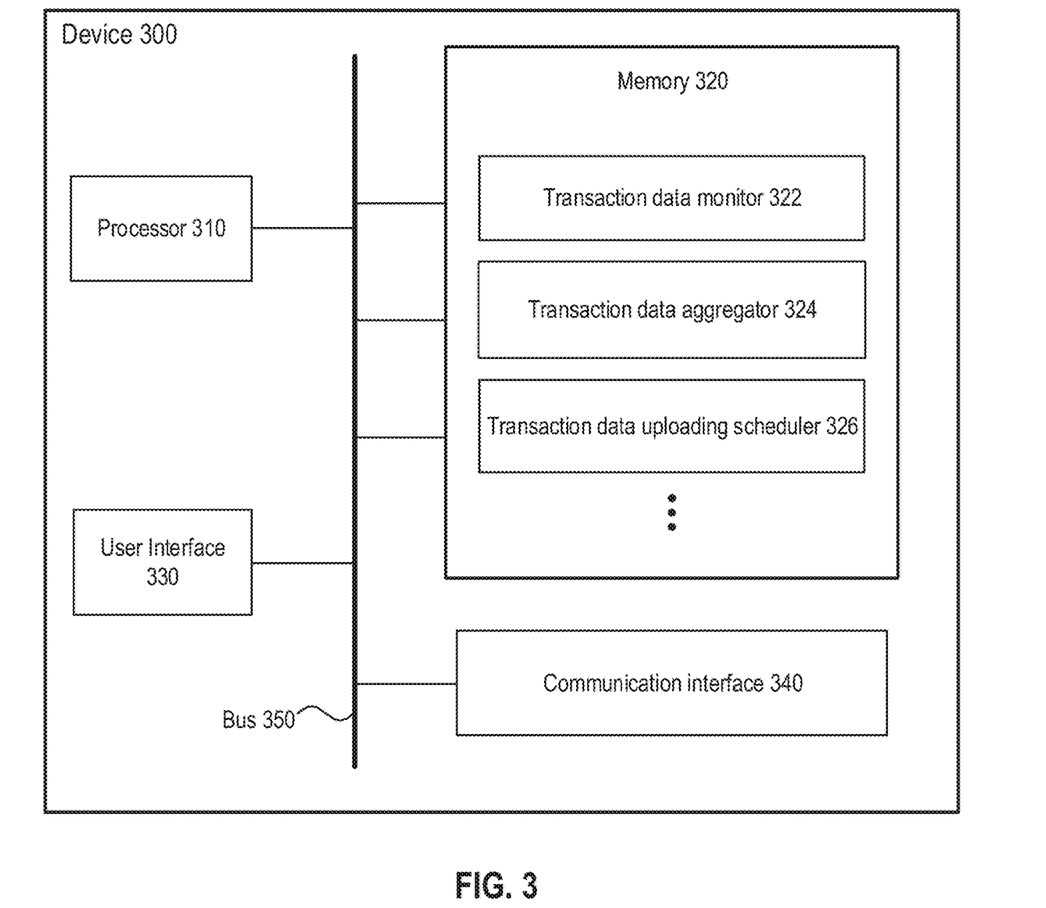
FIG. 3 is a schematic diagram of a device for providing transaction data to a blockchain system for processing, according to an embodiment.

FIG. 3 is a schematic diagram of a device 300, for implementing the party A's system or the party B's system (FIG. 2), for providing transaction data to a blockchain system for processing, according to an embodiment. The device 300 may take any forms, including but not limited to, a desktop computer, a laptop computer, a server computer, a tablet, a smartphone, or a smart watch, or any other forms. Referring to FIG. 3, the device 300 may include a processor 310, a memory 320, a user interface 330, and a communication interface 340 that communicate with one another through a bus 350.

The processor 310 may include one or more dedicated processing units, application-specific integrated circuits (ASICs), field-programmable gate arrays (FPGAs), or various other types of processors or processing units. The processor 310 is coupled with the memory 320 and may execute instructions stored in the memory 320.

The communication interface 340 may facilitate communications between the device 300 and nodes, such as the nodes 102-108 (FIG. 1), in the blockchain system. In an embodiment, the communication interface 340 may upload transaction data to a corresponding node of the blockchain system. The communication interface 340 may also receive a hash of the uploaded data as a confirmation of the uploading and forward the hash to a transaction data system for a record. In an embodiment, the communication interface 340 may support one or more communication standards, such as an Internet standard or protocol including the TCP/IP and TLS/SSL protocols, an Integrated Services Digital Network (ISDN) standard, etc. In an embodiment, the communication interface 340 may include one or more of a Local Area Network (LAN) card, a cable modem, a satellite modem, a data bus, a cable, a wireless communication channel, a radio-based communication channel, a cellular communication channel, an Internet Protocol (IP) based communication device, or other communication devices for wired and/or wireless communications. In an embodiment, the communication interface 340 may be based on public cloud infrastructure, private cloud infrastructure, and hybrid public/private cloud infrastructure.

The memory 320 may store processor-executable instructions and data. The computer executable instructions and data may include a transaction data monitor 322, a transaction data aggregator 324, and a transaction data uploading scheduler 326. The transaction data monitor 322, when executed by the processor 310, allows the device 300 to monitor transaction data of a transaction data system to determine characteristics of the transaction data, such as a type, a size and a similarity of the data. The transaction data aggregator 324, when executed by the processor 310, allows the device 300 to aggregate multiple-transaction data. The aggregation may be performed, for example, by classifying and removing repeated features of the multiple-transaction data. The transaction data uploading scheduler 326, when executed by the processor 310, allows the device 300 to determine a timing and a type (e.g., single-transaction data or an aggregation of multiple-transaction data, etc.) of the uploading. The computer executable instructions and data in the memory 320 may also include a receiver for receiving, from the blockchain system, a verification result of accuracy of the uploaded transaction data as well as verified transaction data to generate bill information and payment information, which will be described in detail below.

In an embodiment, the memory 320 may further function as a buffer to store transaction data obtained from a transaction data system. The stored data may be assigned a time for uploading and a time for removal so that the stored data can be automatically removed from the device 300 after the uploading.

The memory 320 may be any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk.

The user interface 330 may include a display and an input device to transmit user command to the processor 310, etc. The display may display transaction data, an uploading progress, and a status of the blockchain system, etc. The display may include, but is not limited to, cathode ray tube (CRT), liquid crystal display (LCD), light-emitting diode (LED), gas plasma, a touch screen, or other image projection devices for displaying information to a user. The input device may be any type of computer hardware equipment used to provide data and control signals from a user to the processor 310. The input device may include, but is not limited to, a keyboard, a mouse, a scanner, a digital camera, a joystick, a trackball, cursor direction keys, a touchscreen monitor, or audio/video commanders, etc.

In an embodiment, the device 300 may include a transaction data system such that the processor 310 and the user interface 330 are part of the transaction data system.

Figure 4:
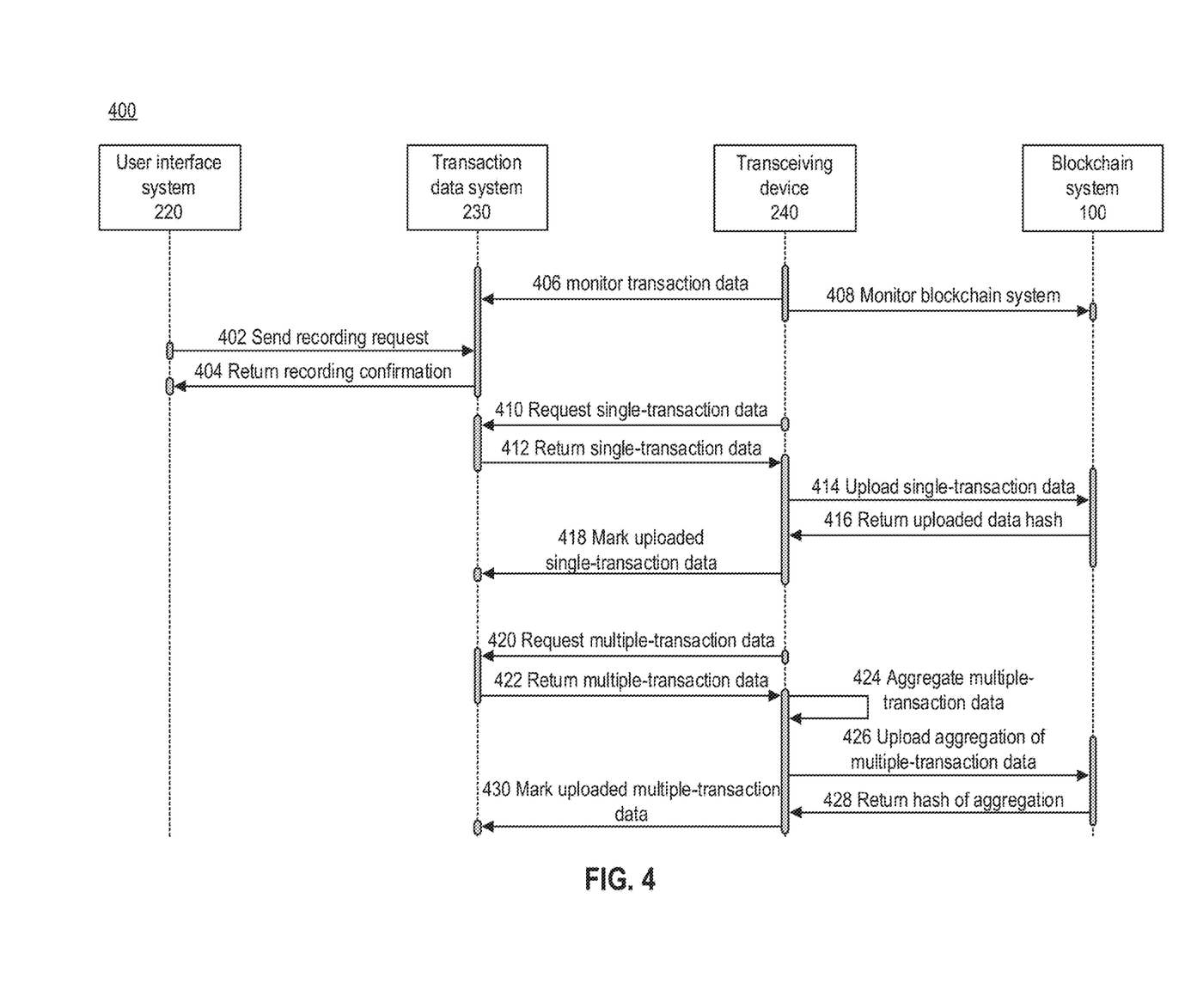
FIG. 4 is a schematic diagram illustrating a method for asynchronously uploading transaction data to a blockchain system for processing, according to an embodiment.

FIG. 4 is a schematic diagram illustrating a method 400 for asynchronously uploading transaction data to a blockchain system, such as the blockchain system 100 (FIG. 1), according to an embodiment. In some embodiments, the blockchain system implements a consortium blockchain. For the sake of brevity, FIG. 4 only shows the operations of the party A's system, and the same operations are also applicable to the party B's system.

Referring to FIG. 4, the user interface system 220 of the party A may perform a transaction and send transaction data to the transaction data system 230 and request the transaction data system 230 to record the data (step 402). The transaction data system 230 may immediately respond to the request by recording the transaction data and then return a confirmation of the recording to the user interface system 220 (step 404). The transaction data recorded in the transaction data system 230 may be provided to the transceiving device 240 for uploading to the blockchain system 100.

In an embodiment, the transceiving device 240 may actively monitor transaction data of the transaction data system (step 406). For example, the transceiving device 240 may monitor accounts in the transaction data system 230. Also, for example, the transceiving device 240 may monitor multiple transactions to determine whether there are related transactions and thus have some repeated features. The transceiving device 240 may also monitor a size of transaction data and estimate a processing time.

In an embodiment, the transceiving device 240 may also monitor a status of the blockchain system 100 (step 408). For example, the transceiving device 240 may monitor a size of a data block of the blockchain system 100, a frequency of uploading data to the blockchain system 100, and a number of transactions processed by the blockchain system 100 during a predetermined time period.

Based on the monitoring, the transceiving device 240 may determine an optimal number of transactions (a single transaction or multiple transactions) and a size of the data to be uploaded. For example, if multiple transactions have repeated features, the transceiving system 240 may determine to aggregate the multiple-transaction data before uploading. On the other hand, if multiple transactions are completely different from each other, or the size of a data block of the blockchain system 100 is not large enough, the transceiving device 240 may determine to upload single-transaction data instead of multiple-transaction data at this time.

In an embodiment, the transceiving system 240 may determine to upload single-transaction data and thus send a request for the single-transaction data to the transaction data system 230 (step 410). The transaction data system 230 may immediately respond to the request by returning the requested single-transaction data (step 412). The transceiving device 240 may upload the single-transaction data to the blockchain system 100 (step 414). In some embodiments, the transceiving device 240 may sign the single-transaction data by encrypting the data with a private key. As a confirmation of the uploading, the blockchain system 100 may return a hash of the uploaded single-transaction data to the transceiving device 240 (step 416). The transceiving device 240 may send the uploaded single-transaction data hash to the transaction data system 230, so that the transaction data system 230 may mark the uploaded transaction data (step 418) to conclude the recording.

In an embodiment, the transceiving device 240 may determine to upload an aggregation of multiple-transaction data and thus send a request to the transaction data system 230 for the multiple-transaction data (step 420). The transaction data system 230 may immediately respond to the request by returning the requested multiple-transaction data to the transceiving device 240 (step 422). The transceiving system 240 may then generate an aggregation of the multiple-transaction data (step 424), for example, by removing redundancy or repeated features. The transceiving system 240 may upload the aggregation of the multiple-transaction data to the blockchain system 100 (step 426). In some embodiments, the transceiving device 240 may sign the aggregation of the multiple-transaction data by encrypting the data with a private key. As a confirmation of the uploading, the blockchain system 100 may return a hash of the uploaded aggregation of the multiple-transaction data to the transceiving device 240 (step 428). The transceiving device 240 may forward the hash of the uploaded aggregation of the multiple-transaction data to the transaction data system 230, so that the transaction data system 230 may mark the uploaded transaction data to conclude the recording (step 430).

In the method 400 described above, the transceiving device 240 functions as a buffer for the transaction data to be uploaded, and at the same time, also functions as a controller of the uploading process, thereby realizing a controlled, asynchronous uploading of the transaction data. This may avoid occurrence of clog or even stall of the blockchain system due to overloading, enhancing efficiency of the blockchain system, so that the blockchain system may be amenable to high-volume or high-frequency transactions.

Once transaction data is uploaded into the blockchain system, the transaction can be authenticated and the transaction data may be verified by the parties involved in the transaction in the blockchain system.

The authentication of the transaction by the parties may be performed based on a cryptography algorithm that provides a pair of keys including a private key and a public key. The private key may be associated with a particular party and may encrypt transaction data. The encryption of transaction data may also be referred to as signing the transaction(s). The public key may be provided to another party in the blockchain system to decrypt the encrypted data, to verify whether the transaction(s) are indeed authorized by that particular party. The decryption may also be referred to as signature verification. In the embodiment, the blockchain system may support a plurality of cryptography algorithms, such as an RSA (Rivest-Shamir-Adleman) algorithm, an Elliptic Curve Digital Signature Algorithm (ECDSA), an SM2 algorithm, and the like.

After authentication of the transaction(s) by the parties, accuracy of the transaction data uploaded to the blockchain system may be verified. In an embodiment, the party A and the party B are involved in the verification of the transaction data, where the party A is the party submitting the transaction data. In an embodiment, after the party A's system sends the transaction data to a node in the blockchain system, e.g., the node 102 in the blockchain system 100 (FIG. 1), the node may broadcast the transaction data in the blockchain system. The party B's system may receive the transaction data through another node in the blockchain system, e.g., the node 106 in the blockchain system 100 (FIG. 1), and may compare the transaction data received from the party A with its own transaction data to verify the accuracy of the received transaction data. In an embodiment, the party B's system may also upload its own transaction data from the transaction data system 260 (FIG. 2) to the blockchain system so the transaction data of the party A and the transaction data of the party B may be compared in the blockchain system. In an embodiment, instead of broadcasting the transaction data uploaded by the party A's system, the party B's system may directly request the transaction data from the party A's system. If the transaction data is determined to be accurate, the party B's system may further send the verification result to the party B's system via the blockchain system and generate a bill for the party A.

Figure 5:
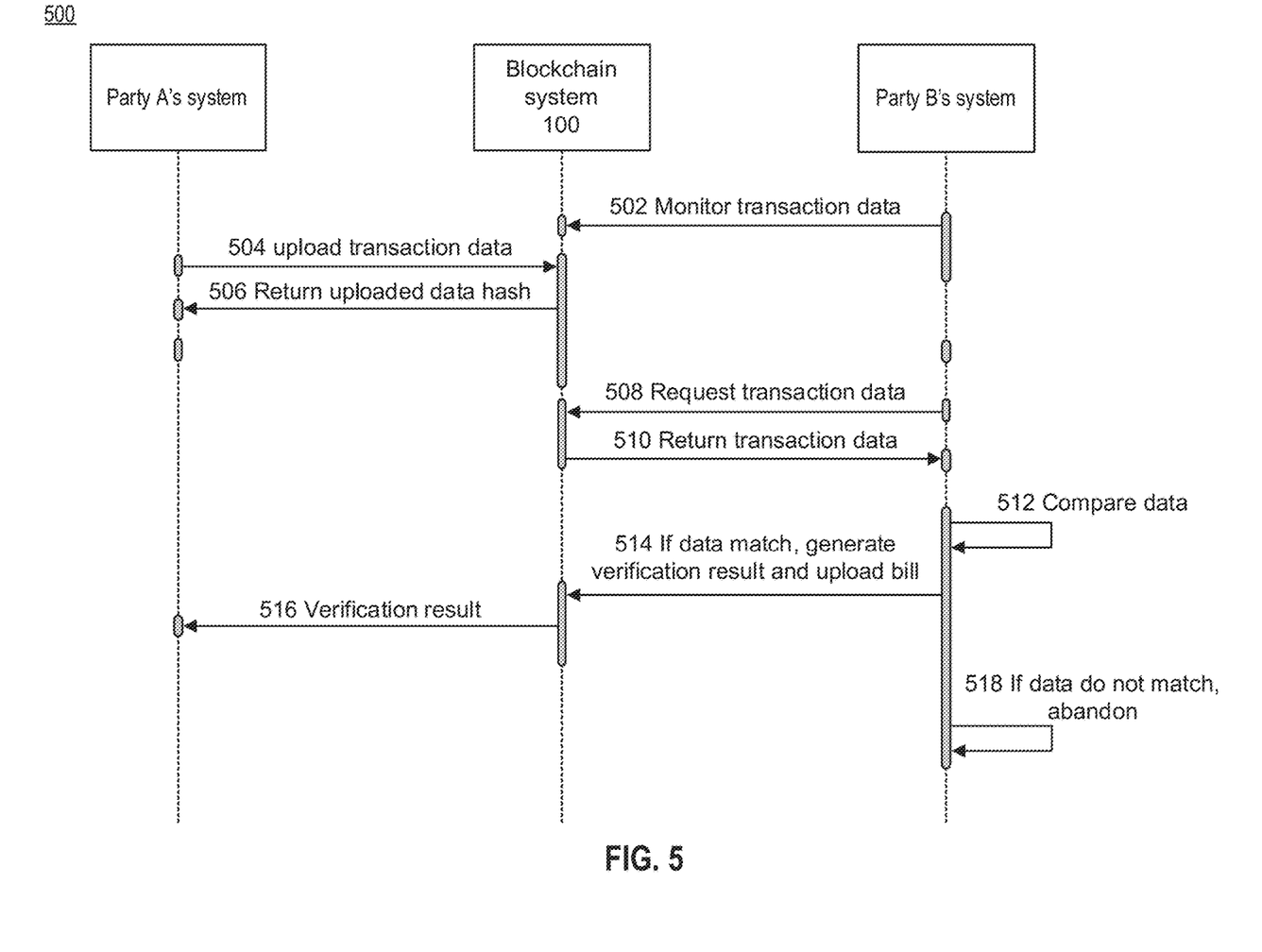
FIG. 5 is a schematic diagram illustrating a method for performing verification of transaction data provided to a blockchain system for processing, according to an embodiment.

FIG. 5 is a schematic diagram illustrating a method 500 for performing verification of transaction data submitted to a blockchain system, such as the blockchain system 100 (FIG. 1), according to an embodiment. In this embodiment, the party B's system may actively monitor transaction data that is uploaded to the blockchain system 100 by the party A's system (step 502). Once the party A's system uploads single-transaction data or an aggregation of multiple-transaction data to the blockchain system 100 (step 504), the blockchain system 100 may return a hash of the uploaded data to the party A's system as a confirmation of the uploading (step 506).

In an embodiment, the party B's system may request the uploaded transaction data from the blockchain system 100 (step 508), and the blockchain system 100 may send the uploaded transaction data to the party B's system (step 510). In an embodiment, the party A's system may broadcast the uploaded transaction data in the blockchain system so that the party B's system can obtain the data without requesting. After obtaining the transaction data uploaded by the party A's system, the party B's system may compare the uploaded transaction data with its transaction data (step 512). If the data match, the party B's system may mark the data as verified, generate a verification result, which may include a bill for the party A, and upload the verification result to the blockchain system 100 (step 514). The uploaded verification result may be broadcasted in the blockchain system 100, so that the party A's system may obtain the bill and mark the transaction data as verified (step 516). On the other hand, during the comparison in step 512, if the party B's system finds that the data do not match, then the party B's system may ignore or abandon the transaction data (step 518). In an embodiment, the party B's system may further request new transaction data from the party A's system.

By uploading and verifying transaction data in the blockchain system, the need for a central intermediary is eliminated and the security of the transaction is enhanced, leading to enhanced efficiency and reduced cost of the transaction.

Figure 6:
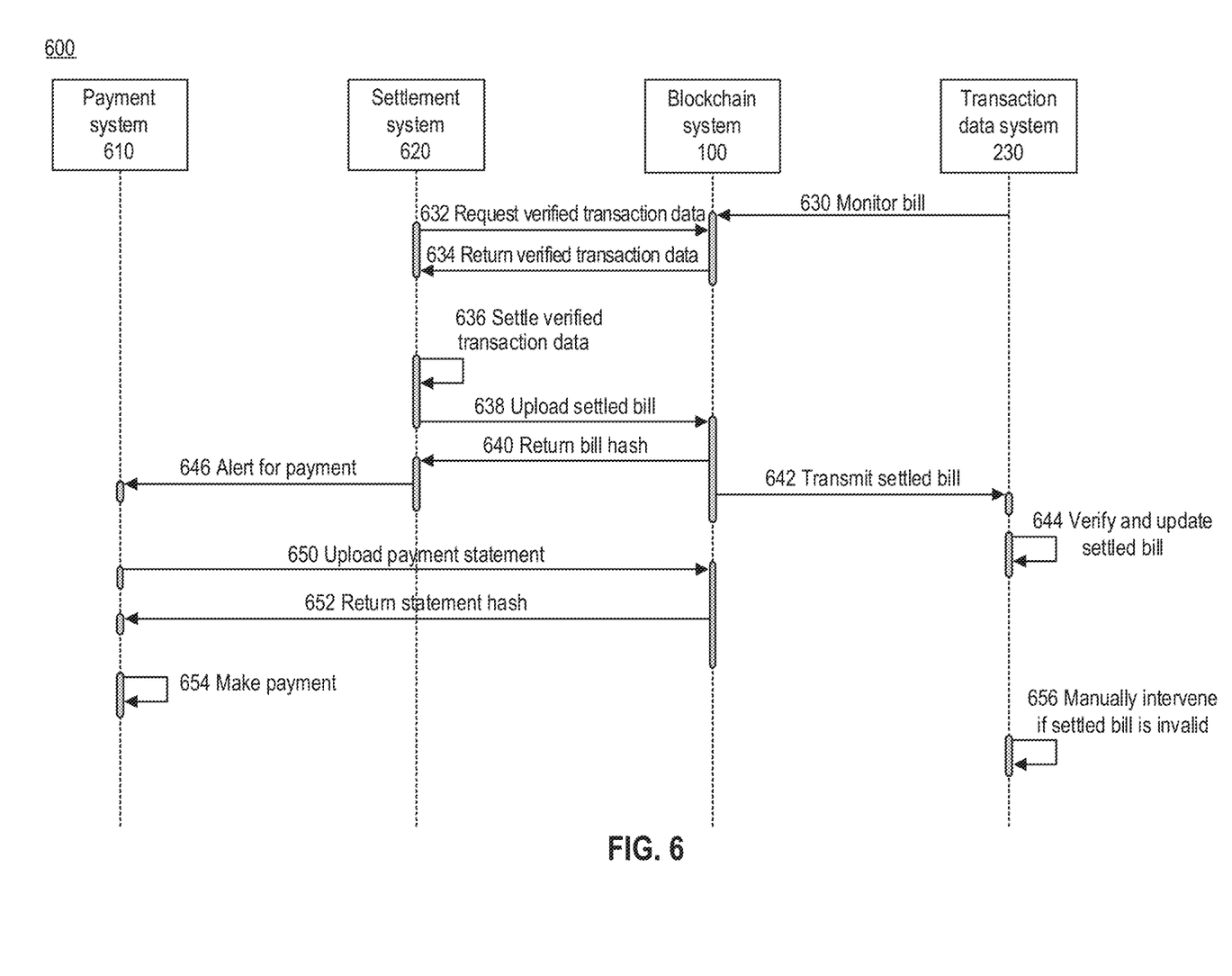
FIG. 6 is a schematic diagram illustrating a method for processing transaction data provided to a blockchain system for processing, according to an embodiment.

FIG. 6 is a schematic diagram illustrating a method 600 for performing settlement of a bill and processing a payment in a blockchain system, such as the blockchain system 100 (FIG. 1), according to an embodiment. In this embodiment, it is assumed that the party A is a party that is liable for the payment. The method 600 may be performed by a payment system 610, a settlement system 620, the blockchain system 100, and the party A's transaction data system 230. In some embodiments, the payment system 610 and the settlement system 620 may be included in the party A's system (FIG. 2). In other embodiments, the payment system 610 and the settlement system 620 may be separate from the party A's system (FIG. 2).

Referring to FIG. 6, the party A's transaction data system 230 may actively monitor bills that are uploaded to the blockchain system 100 (step 630). The settlement system 620 may send a request to the blockchain system 100 for verified transaction data (step 632), and in response, may receive the verified transaction data (step 634). The verified transaction data may be single-transaction data or an aggregation of multiple-transaction data. The settlement system 620 may settle the verified transaction data (step 636), and then upload a settled bill to the blockchain system 100 (step 638). In return, the blockchain system 100 may transmit a bill hash to the settlement system 620 as a confirmation of the uploading (step 640). The settlement system 620 may send an alert to the payment system 610 (step 646) so that the payment system 610 may upload a payment statement to the blockchain system 100 (step 650). The blockchain system 100 may send a statement hash to the payment system 610 as a confirmation of the uploading (step 652). The payment system 610 may then proceed with making the payment (step 654).

On the other hand, the blockchain system 100 may transmit the settled bill to the party A's transaction data system 230 (step 642) so that the transaction data system 230 may verify and update the settled bill (step 644). In an embodiment, the transaction data system 230 may verify the settled bill by comparing the bill settled by the settlement system 620 with the bill generated by the party B and verified by the party A (steps 514 and 516 in FIG. 5). In the case that the party A's transaction data system 230 finds that the settled bill does not match the bill generated by the party B, the party A may determine that the settled bill is not valid. The party A may further manually intervene to prevent the payment system 610 from making the payment (step 656).

The above described embodiments provide methods that can perform a verification of transaction data, a settlement of transaction data and a payment processing in a blockchain system, based on the controlled, asynchronous uploading of the transaction data, thereby reducing a transaction processing time and eliminating the need of a central intermediary, which leads to enhanced security and efficiency of the transaction, and reduced cost of the transaction.

Figure 7:
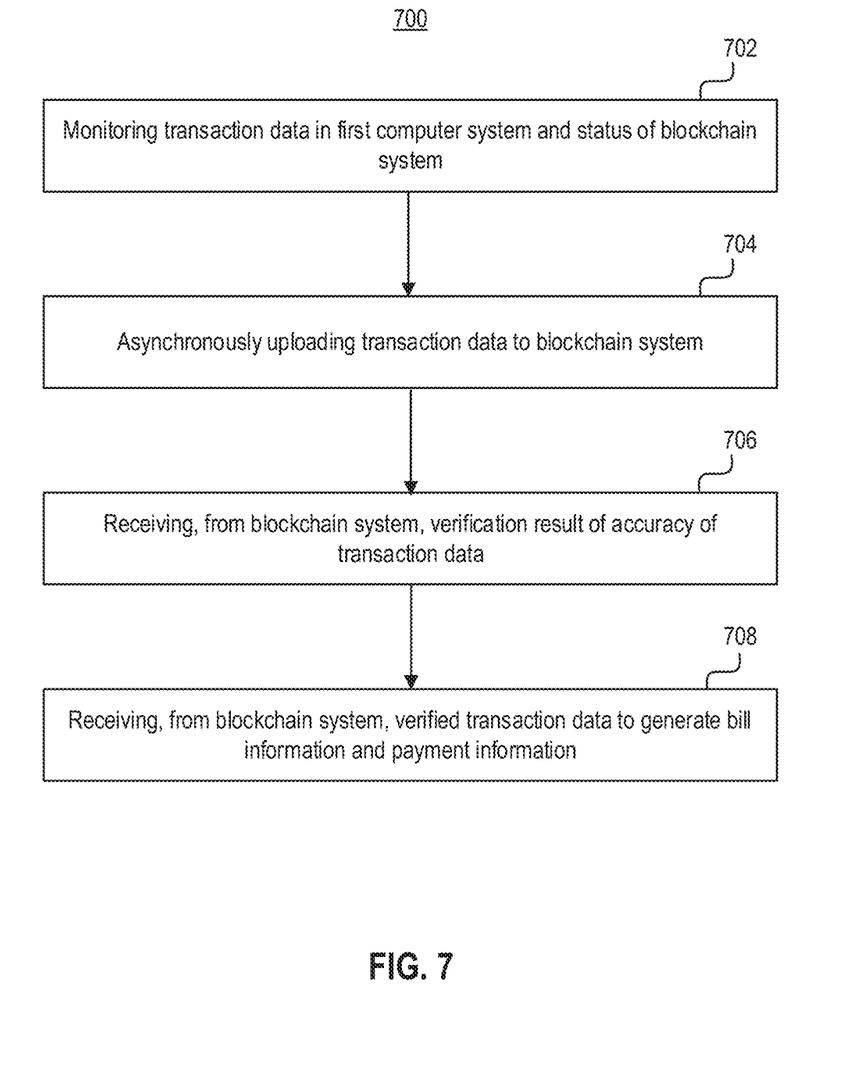
FIG. 7 is a flow chart of a method for providing transaction data to a blockchain system for processing, according to an embodiment.

FIG. 7 is a flow chart of a method 700 for providing transaction data to a blockchain system, such as the blockchain system 100 (FIG. 1), for processing, according to an embodiment. For example, the method 700 may be performed by the party A's system or the party B's system illustrated in FIG. 2.

Referring to FIG. 7, a first computer system, e.g., the party A's system, monitors transaction data in the computer system and a status of the blockchain system (step 702). The transaction data include at least one of single-transaction data or multiple-transaction data. Based on the monitoring, the first computer system asynchronously uploads the transaction data to the blockchain system (step 704). In some embodiments, the first computer system determines whether to upload the single-transaction data or the multiple-transaction data based on the status of the blockchain system. In some embodiments, the first computer system determines a time for uploading the transaction data to the blockchain system. In some embodiments, the first computer system generates an aggregation of the multiple-transaction data when it is determined to upload the multiple-transaction data, e.g., by removing a repeated feature of the multiple-transaction data. In some embodiments, the first computer system monitors the status of the blockchain system by monitoring at least one of a size of a data block in the blockchain system, a frequency of data uploading in the blockchain system, or a number of transactions processed by the blockchain system during a predetermined time period.

The first computer system further receives, from the blockchain system, a verification result that the transaction data is accurate (step 706). In some embodiments, the transaction data is verified by a second computer system, e.g., the party B's system, by obtaining the transaction data from the blockchain system and comparing the transaction data with its own transaction data. In some embodiments, the first computer system marks the transaction data as being verified in the computer system. The first computer system also receives, from the blockchain system, verified transaction data to generate bill information and payment information relating to the transaction data (step 708). The bill information and the payment information are recorded in the blockchain system. Reference can be made to FIGS. 4-6 and the corresponding description for additional detail for the method 700.

Figure 8:
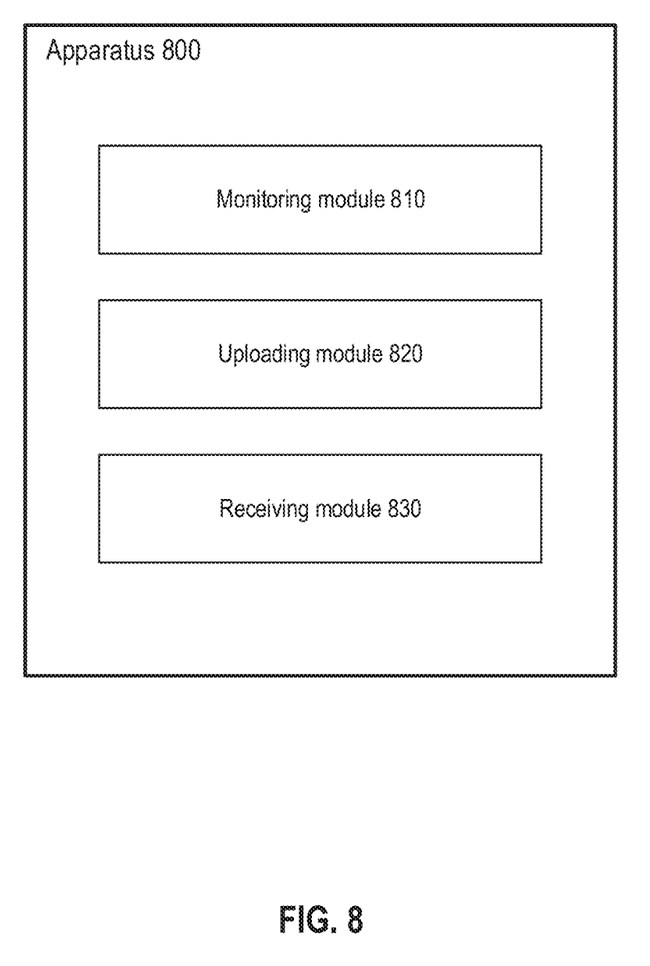
FIG. 8 is a schematic diagram of an apparatus for providing transaction data to a blockchain system for processing, according to an embodiment.

FIG. 8 is a schematic diagram of an apparatus 800 for providing transaction data to a blockchain system for processing, according to an embodiment. For example, the apparatus 800 may be an implementation of a software process, and may correspond to the method 700 (FIG. 7). As shown in FIG. 8, the apparatus 800 may include a monitoring module 810, an uploading module 820, and a receiving module 830.

The monitoring module 810 monitors transaction data in the apparatus 800 and a status of the blockchain system. Based on the monitoring, the uploading module 820 asynchronously uploads the transaction data to the blockchain system. The receiving module 830 receives, from the blockchain system, a verification that the transaction data is accurate, and also receives, from the blockchain system, verified transaction data to generate bill information and payment information.

Each of the above described modules may be implemented as software, or hardware, or a combination of software and hardware. For example, each of the above described modules may be implemented using a processor executing instructions stored in a memory. Also, for example, each the above described modules may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the described methods. Further for example, each of the above described modules may be implemented by using a computer chip or an entity, or implemented by using a product having a certain function. In one embodiment, the apparatus 600 may be a computer, and the computer may be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an implementation process of functions and roles of each module in the apparatus 800, references can be made to corresponding steps in the above-described methods. Details are omitted here for simplicity.

In an embodiment, there is also provided a computer program product. The computer program product may include a non-transitory computer-readable storage medium having computer-readable program instructions thereon for causing a processor to carry out the above-described methods.

The computer-readable storage medium may be a tangible device that can store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The computer-readable program instructions for carrying out the above-described methods may be assembler instructions, instruction-set-architecture (ISA) instructions, machine instructions, machine-dependent instructions, microcode, firmware instructions, state-setting data, or source code or object code written in any combination of one or more programming languages, including an object-oriented programming language, and conventional procedural programming languages. The computer-readable program instructions may execute entirely on a computing device as a stand-alone software package, or partly on a first computing device and partly on a second computing device remote from the first computing device. In the latter scenario, the second, remote computing device may be connected to the first computing device through any type of network, including a local area network (LAN) or a wide area network (WAN).

The computer-readable program instructions may be provided to a processor of a general-purpose or special-purpose computer, or other programmable data processing apparatus to produce a machine, such that the instructions, which execute via the processor of the computer or other programmable data processing apparatus, create means for implementing the above-described methods.

The flow charts and diagrams in the figures illustrate the architecture, functionality, and operation of possible implementations of devices, methods, and computer program products according to various embodiments of the specification. In this regard, a block in the flow charts or diagrams may represent a software program, segment, or portion of code, which comprises one or more executable instructions for implementing specific functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the diagrams and/or flow charts, and combinations of blocks in the diagrams and flow charts, may be implemented by special purpose hardware-based systems that perform the specified functions or acts, or combinations of special purpose hardware and computer instructions.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not essential features of those embodiments, unless noted as such.

Although the specification has been described in conjunction with specific embodiments thereof, it is evident that many alternatives, modifications and variations will be apparent to those skilled in the art. Accordingly, the following claims embrace all such alternatives, modifications and variations that fall within the terms of the claims.

What is claimed is:

1. A computer-implemented method for providing transaction data to a blockchain system for processing, the method comprising:
   monitoring the transaction data in a computer system; and
   based on the monitoring, asynchronously uploading the transaction data to the blockchain system,
   wherein the transaction data include single-transaction data and multiple-transaction data, and the method further comprises:
   monitoring a status of the blockchain system; and
   determining whether to upload the single-transaction data or the multiple-transaction data based on the status of the blockchain system.

2. The method of claim 1, further comprising:
   determining a time for uploading the transaction data to the blockchain system.

3. The method of claim 1, further comprising:
   generating an aggregation of the multiple-transaction data when it is determined to upload the multiple-transaction data.

4. The method of claim 3, wherein the generating the aggregation of the multiple-transaction data comprises:
   removing a repeated feature of the multiple-transaction data.

5. The method of claim 1, wherein monitoring the status of the blockchain system comprises:
   monitoring at least one of a size of a data block of the blockchain system, a frequency of data uploading in the blockchain system, or a number of transactions processed by the blockchain system during a predetermined time period.

6. The method of claim 1, further comprising:
   receiving, from the blockchain system, a verification result that the transaction data is accurate, wherein the transaction data is verified by another computer system by obtaining the transaction data from the blockchain system and comparing the transaction data with its own transaction data.

7. The method of claim 6, further comprising:
   marking the transaction data as being verified in the computer system.

8. The method of claim 6, further comprising:
receiving, from the blockchain system, verified transaction data to generate bill information and payment information relating to the verified transaction data, wherein the bill information and the payment information are recorded in the blockchain system.

9. The method of claim 1, wherein the blockchain system implements a consortium blockchain.

10. A device for providing transaction data to a blockchain system for processing, comprising:
one or more processors; and
one or more computer-readable memories coupled to the one or more processors and having instructions stored thereon that are executable by the one or more processors, wherein the one or more processors are configured to:
monitor the transaction data; and
based on the monitoring, asynchronously upload the transaction data to the blockchain system,
wherein the transaction data include single-transaction data and multiple-transaction data, and the one or more processors are further configured to:
monitor a status of the blockchain system; and
determine whether to upload the single-transaction data or the multiple-transaction data based on the status of the blockchain system.

11. A non-transitory computer-readable medium having stored therein instructions that, when executed by a processor of a device, cause the device to perform a method for providing transaction data to a blockchain system for processing, the method comprising:
monitoring the transaction data; and
based on the monitoring, asynchronously uploading the transaction data to the blockchain system,
wherein the transaction data include single-transaction data and multiple-transaction data, and the method further comprises:
monitoring a status of the blockchain system; and
determining whether to upload the single-transaction data or the multiple-transaction data based on the status of the blockchain system.

12. The device of claim 10, wherein the one or more processors are further configured to:
determine a time for uploading the transaction data to the blockchain system.

13. The device of claim 10, wherein the one or more processors are further configured to:
generate an aggregation of the multiple-transaction data when it is determined to upload the multiple-transaction data.

14. The device of claim 13, wherein in generating the aggregation of the multiple-transaction data, the one or more processors are further configured to:
remove a repeated feature of the multiple-transaction data.

15. The device of claim 10, wherein in monitoring the status of the blockchain system, the one or more processors are further configured to:
monitor at least one of a size of a data block of the blockchain system, a frequency of data uploading in the blockchain system, or a number of transactions processed by the blockchain system during a predetermined time period.

16. The device of claim 10, wherein the one or more processors are further configured to:
receive, from the blockchain system, a verification result that the transaction data is accurate, wherein the transaction data is verified by another computer system by obtaining the transaction data from the blockchain system and comparing the transaction data with its own transaction data.

17. The device of claim 16, wherein the one or more processors are further configured to:
mark the transaction data as being verified in the computer system.

* * * * *